Figure 1:
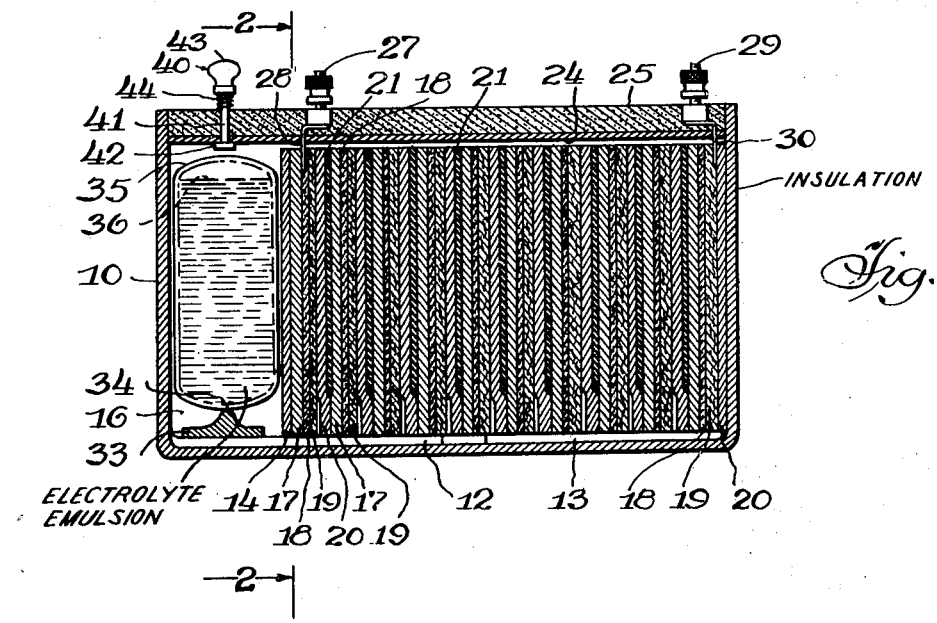

May 18, 1948. T. G. MOIR 2,441,896
EMULSIFIED BATTERY ELECTROLYTE
Filed Jan. 17, 1945

INVENTOR.
Thomas G. Moir,
BY
Tesch and Darbo
Attys.

Patented May 18, 1948

2,441,896

UNITED STATES PATENT OFFICE 2,441,896

EMULSIFIED BATTERY ELECTROLYTE

Thomas G. Moir, Round Lake, Ill., assignor to Burgess Battery Company, Freeport, Ill., a corporation of Delaware Application January 17, 1945, Serial No. 573,150

9 Claims. (Cl. 136—154)

1

This invention relates to improvements in primary batteries, and while it relates especially to batteries of the deferred action type, it is not limited to that type. The invention is directed toward improvements in such batteries which provide increased resistance against short circuits between cells and increased uniformity of consumption or corrosion of the anodes of the several cells.

In series connected multiple cell deferred action batteries, one of the serious problems is the prevention of short circuits between cells after the battery has been activated. These can be prevented by introducing the proper amount of activating liquid separately into each individual cell and confining it to such cell, but this is cumbersome and inconvenient. If the activating liquid is introduced into all of the cells from a common space which is in communication with the cells, it has been found that the cells frequently do not all receive adequate amounts of electrolyte and the electrodes are not uniformly wetted by the electrolyte. It has been found also that the different anodes frequently are consumed at non-uniform rates and that short circuits occur between different cells.

It is the primary object of the invention to provide an improved construction for series connected multiple cell batteries which permits the desirable easy and convenient activation and in which the above defects are absent.

Another object is to provide means in such a battery for permitting the introduction of all of the activating liquid simultaneously into a common space from which it may flow to be absorbed into the electrolyte spaces of the several cells without causing short circuits between cells.

Another object is to provide means for counteracting the tendency for the anodes of the different cells to be wetted and consumed non-uniformly.

A further object is to provide means for facilitating the absorption of electrolyte into the interelectrode spaces and the wetting of the electrode surfaces by the electrolyte.

A specific object is to provide a primary cell and a multiple cell primary battery having an electrolyte in the form of an emulsion.

Other objects and advantages will become apparent as the following description progresses.

The invention is described and illustrated in connection with a deferred action type of primary battery, but it is understood that it is not limited thereto, but may be employed with primary batteries in general.

Figure 2:
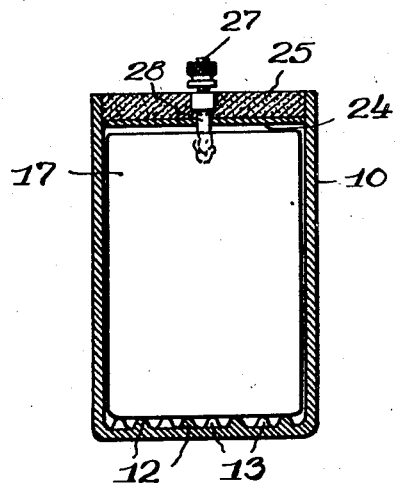

In the drawing:

Fig. 1 is a sectional elevational view of a multiple cell battery of the invention; and Fig. 2 is a sectional view taken along line 2—2 of Fig. 1.

2

Referring to the drawing, the battery comprises a container 10 which is generally rectangular in shape and has an open top and is composed of an electrical insulating and electrolyte resisting material, such as wood, phenol-formaldehyde resin, etc. The bottom of the container 10 has longitudinal ridges 12 and 13 upon the interior surface thereof, which ridges may be integral with the bottom and extend inwardly from opposite ends of the container respectively to a point somewhat beyond the middle of the container, whereby the end portions of the ridges overlap.

Spaced inwardly from the left-hand end of container 10, as the same is viewed in Fig. 1, is a transverse partition 14 which may be composed of the same material as is the container 10 and which rests upon ridges 11 and extends upwardly to a point short of the top of the container, as shown. The partition 14 may be integrally joined at its edges to the side walls of the container, or otherwise suitably fastened in position.

The partition 14 forms a compartment 16 at one end of the container 10 and in the remainder of the container are arranged the elements of the battery. While the invention may be employed with any desired type of battery, to facilitate the description a specific battery will be described which is of the plate type, i. e., in which the cell elements are in the form of juxtaposed thin flat sheets or plates. The first element is the cathode 17 which is composed of silver and is arranged against the partition 14. The cathode 17 rests upon the ridges 12 and extends substantially across the interior of the container 10 and upwardly to a height substantially the same as that of partition 14, as shown in Fig. 2.

Against the cathode 17 is arranged the second cell element 18 which is a layer of depolarizing material in the form of a water-insoluble silver halide, for example silver bromide. Adjacent to the depolarizing layer 18 is a layer 19 of bibulous electrical insulating and electrolyte-resisting material, such as porous blotting paper, and adjacent to the bibulous layer 19 is the plate-form anode 20 composed of magnesium. The transverse dimensions of these elements are substantially the same as those of cathode 17. Upon activation of the battery, the bibulous layer 19 is wetted with the electrolyte, as will be described hereinafter, and forms the electrolyte space between the anode and cathode. The anode 20 is connected at its bottom portion, as by welding, brazing, etc., to the cathode 17 of the second cell. Above the portions of said anode and cathode which are joined together, the said electrodes are separated by a layer of liquid-impervious, electrical insulating and electrolyte-resisting material 21, which may be a thin sheet composed of varnished paper, copolymerized vinyl chloride and vinyl acetate, the rubber hydrochloride material sold under the trade-mark "Pliofilm," the rubber and paraffin composition sold under the trade-mark "Parafilm," or the like. It serves to separate the surfaces of said anode and cathode, and exclude the electrolyte from between them, whereby local action is prevented.

Proceeding from the cathode 17 of the second cell, the arrangement of cell elements is the same as has been described in connection with the first cell and the corresponding elements of the succeeding cells are designated by the same numerals. The anode of each cell is connected to the cathode of each succeeding cell as described heretofore whereby the cells are connected together in series.

The open top of the container 10 is closed by a sheet-form member 24 of electrical insulating and electrolyte resisting material, for example paperboard, and a heat fusible sealing composition 25, composed, for example, of wax or pitch, is arranged upon the top of the sheet 24 to form a seal closure for the top of the battery.

A battery terminal 27 is embedded in the sealing composition 25 and is connected to the cathode 17 of the first cell by the conductor 28 by soldering or other suitable means. A second battery terminal 29 is embedded in the sealing material 25 and is connected by a conductor 30 to the anode 20 of the last cell. Terminals 27 and 29 are adapted to be connected to an external circuit.

The cell elements located to the right of the middle of the container 10, as the same is viewed in Fig. 1, rest upon the ridges 13, while those located to the left of that point rest upon the ridges 12.

In the compartment 16 and resting upon the ridges 12 is arranged a supporting member 33, preferably composed of electrolyte-resisting material, such as phenol-formaldehyde resin, metal, or the like, and having an upwardly extending projection 34. Also within compartment 16 and resting upon projection 34 is a frangible envelope 35, composed of thin sheet glass or other readily rupturable material, within which is contained the activating liquid 36, which is the electrolyte for the battery. In accordance with the present invention, such electrolyte is an emulsion of a non-conductive, water-immiscible liquid and an aqueous solution of an electrolyte compound. In the specific battery described, a suitable emulsion is formed of the following composition, in parts by weight:

| | |
|---|---|
| Carbon tetrachloride | 80 |
| Lithium bromide | 29 |
| Diamyl sodium sulfosuccinate (sold under the trade-mark "Aerosol AY") | 2.2 |
| Water | 60 |

Prior to being inserted into the envelope 35, the composition is shaken thoroughly to emulsify the same, or is processed through a suitable emulsifying apparatus, such as a colloid mill. The resulting emulsion is stable and will remain substantially unchanged for a long period of time.

In the described emulsion, the carbon tetrachloride is the water-immiscible liquid, the lithium bromide is the electrolyte compound and the diamyl sodium sulfosuccinate is an emulsifying agent which serves to give the emulsion the desired stability. It is also a wetting agent and facilitates the absorption of the electrolyte by the depolarizing layers 18 and the bibulous layers 19, and the wetting of the electrodes by the electrolyte. The water immiscible liquid is the continuous phase and the aqueous liquid is the dispersed phase.

Means for rupturing the frangible envelope 35 comprises a plunger 40 which extends through an opening in the closure sheet 24 and seal 25 and has its lower end arranged in adjacent relationship to the top of the frangible envelope 35. The plunger 40 comprises a shank 41 having an enlargement 42 at the lower end thereof which cooperates with the closure sheet 24 to form a stop against the upward movement of the plunger. The shank 41 extends upwardly from the upper surface of the seal 25 and has a knob 43 at the upper end thereof, spaced from said seal 25. A helical spring member 44 surrounds the shank 41 and is compressed between the seal 25 and the knob 43.

In activating the battery, the plunger 40 is depressed manually, rupturing the envelope 35 and releasing the activating emulsion 36. The latter flows down into the bottom of compartment 16 and passes underneath the partition 14 via the spaces between the ridges 12. It passes longitudinally along these spaces and laterally around the ends of the ridges 12 and 13, and into the spaces between ridges 13. In this way it spreads throughout the bottom of the container 10. Sufficient of the emulsion is employed to fill the container above the level of the lower edges of the battery elements. It is immediately absorbed by the bibulous layers 19 and spreads upwardly throughout the layers, saturating the same. It also is absorbed by the layers 18 of the depolarizing material, some of it passing from the bibulous layers 19 to said depolarizing layers and the remainder passing directly upwardly from the bottom edges of the depolarizing layers. The depolarizing layers are thereby moistened, and the emulsion therein and in the bibulous layers 19 supplies the electrolytic conductivity necessary for the operation of the battery. The wetting properties of the emulsifying agent facilitates the absorption of the emulsion by the layers 18 and 19, and it also assists the dispersed globules of electrolyte in wetting the surfaces of the electrodes. As a result, all of the cells receive an adequate amount of electrolyte and the anodes are uniformly wetted by the electrolyte.

After the bibulous layers 19 and depolarizing layers 18 have absorbed all of the liquid emulsion which they will absorb, there is still a body of the liquid in the bottom of the container 10 which makes contact with the bottom edges of the cell elements. Such liquid, if it were in the form of an ordinary aqueous solution of an electrolyte compound, would form a conductive medium between the electrodes of the different cells and form a short circuit between such cells. It has been found that the emulsion electrolyte does not form such a conductive medium and there is no substantial short circuit current between cells.

There is also a slight exudation of the electrolyte from the top and side edges of the depolarizing layers 18 and the bibulous layers 19 and this migrates to the edges of the electrodes, with the result that such edges are coated with a film of the electrolyte. If an ordinary electrolyte solution were employed, short circuit current would flow between the cells by way of such films. With the emulsion form of electrolyte of the present invention, there is no substantial short circuit current flowing by such path. In general, if there is any short circuit current in the battery, it is so small as to be negligible.

The battery of the present invention operates functionally in the same manner as does a battery which employs a plain solution of an electrolyte compound instead of an emulsion. It has a high total capacity and a long useful life. The non-uniform wetting and corrosion of the anodes of the different cells and the short circuits between cells which have been found in the batteries having a plain electrolyte solution are absent from the battery of the present invention. The presence of adequate electrolyte in every cell and the uniform wetting of the electrode surfaces results in an improved and uniform electrolytic action.

As has been stated heretofore, the specific battery which has been described and illustrated herein is an example only of the invention, with respect to both its physical and chemical features, and the invention may be applied to batteries having elements different from those described. For example, in the battery described heretofore, the electrolyte may be of the following composition, in parts by weight:

| | |
|---|---|
| Chloroform | 45 |
| Lithium chloride | 15.6 |
| Dihexyl sodium sulfosuccinate (sold under the trade-mark "Aerosol MA") | 2.0 |
| Water | 81 |

Also, the anodes may be composed of zinc, aluminum, or other suitable metal, the cathodes may be composed of copper, carbon, etc. and the depolarizing element may be composed of manganese dioxide or other suitable substance. The water-immiscible liquid may be chloroform, amyl acetate, a liquid hydrocarbon such as kerosene, or the like, the electrolyte compound may be ammonium chloride, zinc chloride, hydrochloric acid, etc., and the emulsifying agent may be sodium 2-ethylhexanol sulfate, sold under the trade-mark "Tergitol 08." An emulsifying agent may be used which is not a wetting agent, and such an emulsifier may be used with or without a separate wetting agent. An example of a suitable battery is one of the Leclanche type having a zinc anode, a carbon cathode, a depolarizing element composed of a mixture of manganese dioxide and finely divided carbon or graphite and an electrolyte composed of an emulsion of kerosene and an aqueous solution of ammonium chloride, zinc chloride and sodium 2-ethylhexanol sulfate. The form and mechanical features of the battery may be other than that of the plate type of battery illustrated, and the invention is applicable in general to primary batteries employing liquid electrolytes without limitation to the physical form thereof or the composition of the parts. It is also applicable to batteries in which the liquid electrolyte is incorporated at the time the battery is made.

What is claimed is:

1. In a primary cell having an anode and a cathode, an electrolyte between said anode and cathode in the form of an emulsion comprising a non-conductive water-immiscible liquid, an emulsifying agent and an aqueous solution of an electrolyte compound.

2. In a primary cell having a magnesium anode and a cathode, an electrolyte between said anode and cathode, said electrolyte comprising an emulsion of a non-conductive, water-immiscible liquid, an emulsifying agent and an aqueous solution of an electrolyte compound.

3. An electrolyte for a primary battery comprising an emulsion of an aqueous solution of an electrolyte compound, a non-conductive water-immiscible liquid and an emulsifying agent.

4. In a multiple cell battery, a container, a plurality of electrically connected cells in said container, said cells each having a pair of electrodes, said container having a common space therein to which the electrodes of different cells are exposed, and an electrolyte in said container, said electrolyte being in the form of an emulsion comprising a non-conductive, water-immiscible liquid and an aqueous solution of an electrolyte compound.

5. A battery construction as claimed in claim 1 in which the emulsifying agent is also a wetting agent.

6. In a multiple cell battery, a container, a plurality of serially connected cells in said container, said cells each having a pair of electrodes, said container having a common space therein to which the electrodes of different cells are exposed, and an electrolyte in said container, said electrolyte being in the form of an emulsion comprising a non-conductive, water-immiscible liquid and an aqueous solution of an electrolyte compound.

7. In a multiple cell battery, a container, a plurality of electrically connected cells in said container, said cells each having a pair of electrodes, said container having a common space therein to which the electrodes of different cells are exposed, and an electrolyte in said container, said electrolyte being in the form of an emulsion comprising a non-conductive, water-immiscible liquid, an emulsifying agent and an aqueous solution of an electrolyte compound.

8. In a multiple cell battery, a container, a plurality of electrically connected cells in said container, said cells each having a pair of electrodes, said container having a common space therein to which the electrodes of different cells are exposed, and an electrolyte in said container, said electrolyte being in the form of an emulsion comprising a non-conductive, water-immiscible liquid, a wetting agent and an aqueous solution of an electrolyte compound.

9. In a multiple cell battery, a container, a plurality of electrically connected cells in said container, said cells each having a pair of electrodes, said container having a common space therein to which the electrodes of different cells are exposed, and an electrolyte in said container, said electrolyte being in the form of an emulsion comprising a non-conductive, water-immiscible liquid, an emulsifying agent, a wetting agent and an aqueous solution of an electrolyte compound.

THOMAS G. MOIR.

REFERENCES CITED

The following references are of record in the file of this patent:

UNITED STATES PATENTS

| Number | Name | Date |
|---|---|---|
| 270,884 | Berliner | Jan. 23, 1883 |
| 585,854 | Sully | July 6, 1897 |
| 1,357,160 | French | Oct. 26, 1920 |
| 1,459,659 | Ellis | June 19, 1923 |

OTHER REFERENCES

Davis et al., Bur. Int. Tech., Paper 609 (1940), page 62.

Certificate of Correction

Patent No. 2,441,896.

May 18, 1948.

THOMAS G. MOIR

It is hereby certified that errors appear in the printed specification of the above numbered patent requiring correction as follows: Column 1, line 35, for "to" after "flow" read *or*; column 2, line 17, for "ridges 11" read *ridges 12*; and that the said Letters Patent should be read with these corrections therein that the same may conform to the record of the case in the Patent Office.

Signed and sealed this 24th day of August, A. D. 1948.

[SEAL]

THOMAS F. MURPHY,
*Assistant Commissioner of Patents.*